United States Patent
Okazaki et al.

(10) Patent No.: US 8,199,139 B2
(45) Date of Patent: Jun. 12, 2012

(54) VIEWING ANGLE CONTROL DEVICE AND DISPLAY PROVIDED WITH THE SAME

(75) Inventors: Tsuyoshi Okazaki, Osaka (JP); Takehiko Sakai, Osaka (JP); Katsuhiko Morishita, Osaka (JP); Yoshiharu Kataoka, Osaka (JP); Chikanori Tsukamura, Osaka (JP); Dai Chiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 484 days.

(21) Appl. No.: 12/530,661

(22) PCT Filed: Mar. 13, 2008

(86) PCT No.: PCT/JP2008/054597
§ 371 (c)(1),
(2), (4) Date: Sep. 10, 2009

(87) PCT Pub. No.: WO2008/114678
PCT Pub. Date: Sep. 25, 2008

(65) Prior Publication Data
US 2010/0103148 A1    Apr. 29, 2010

(30) Foreign Application Priority Data
Mar. 16, 2007    (JP) ................... 2007-069129

(51) Int. Cl.
*G06F 3/038* (2006.01)
*G09G 5/00* (2006.01)
(52) U.S. Cl. ........... 345/204; 349/78; 349/123; 349/141
(58) Field of Classification Search .................... 345/204
See application file for complete search history.

(56) References Cited

U.S. PATENT DOCUMENTS

| 2005/0190329 A1* | 9/2005 | Okumura ............ 349/123 |
| 2005/0213055 A1 | 9/2005 | Yokote et al. |
| 2007/0030240 A1 | 2/2007 | Sumiyoshi et al. |

FOREIGN PATENT DOCUMENTS

JP    7-333640    12/1995
(Continued)

OTHER PUBLICATIONS

International Search Report for PCT/JP2008/054597, mailed Jun. 10, 2008.

*Primary Examiner* — Kevin M Nguyen
*Assistant Examiner* — Kenneth B Lee, Jr.
(74) *Attorney, Agent, or Firm* — Nixon & Vanderhye P.C.

(57) ABSTRACT

There are provided a viewing angle control device that can provide a pure black display without coloring and have a significantly improved shielding ability in the narrow viewing angle state, and a display using the viewing angle control device. To adjust the VT (voltage-transmittance) characteristics of a viewing angle control liquid crystal panel (2) that switches a viewing angle between a wide viewing angle state and a narrow viewing angle state by using birefringence of liquid crystal, translucent electrode films (205*r*, 205*g*, 206*b*), to which alternating-current voltages with different frequencies are applied, are provided on a portion of at least one of a pair of translucent substrates (201, 202) sandwiching the liquid crystal, the portion corresponding to at least one color of a picture element of a display liquid crystal panel (1), so that the voltage-transmittance characteristics of the liquid crystal are adjusted.

12 Claims, 9 Drawing Sheets

FOREIGN PATENT DOCUMENTS

| | | |
|---|---|---|
| JP | 10-197844 | 7/1998 |
| JP | 10-268251 | 10/1998 |
| JP | 11-30783 | 2/1999 |
| JP | 3481741 | 10/2003 |
| JP | 2006-47550 | 2/2006 |
| WO | 2007/094358 | 8/2007 |
| WO | 2007/094386 | 8/2007 |
| WO | 2007/094390 | 8/2007 |
| WO | 2008/047754 | 4/2008 |
| WO | 2008/114677 | 9/2008 |

* cited by examiner

|  |  | Comparative example | Example |
|---|---|---|---|
| Wide viewing angle state | Drive voltage [V] | 1.5 | 1.5 |
| Narrow viewing angle state | Drive voltage [V] | 3.5 | 3.9 |
| Transmittance [%] | Blue (450nm) | 13.6 | 8.2 |
|  | Frequency [Hz] | 1000 | 1000 |
|  | Green (550nm) | 0.3 | 0.2 |
|  | Frequency [Hz] | 1000 | 5000 |
|  | Red (650nm) | 6 | 4.6 |
|  | Frequency [Hz] | 1000 | 6750 |

FIG. 7

VIEWING ANGLE CONTROL DEVICE AND DISPLAY PROVIDED WITH THE SAME

This application is the U.S. national phase of International Application No. PCT/JP2008/054597, filed 13 Mar. 2008, which designated the U.S. and claims priority to Japanese Patent Application No. 2007-069129, filed 16 Mar. 2007, the entire contents of each of which are hereby incorporated by reference.

TECHNICAL FIELD

The present invention relates to a viewing angle control device that can switch a viewing angle between a wide viewing angle and a narrow viewing angle by using birefringence of liquid crystal, and a display provided with the same.

BACKGROUND ART

Nowadays, a liquid crystal display has been used commonly in personal computers, PDAs (personal digital assistants), mobile phones, and the like. As such devices become widespread, the chances of displaying information on a liquid crystal display screen in public are increasing.

The following is a brief description of a configuration of a conventional liquid crystal display. The liquid crystal display has a liquid crystal layer sandwiched between a pair of translucent substrates. On one of the translucent substrates (i.e., an active matrix substrate), data signal lines to which display data is applied and gate signal lines for driving active elements described below are arranged in matrix. At each intersection of the data signal lines and the gate signal lines, the active element such as a thin film transistor (TFT) to which a picture element electrode is connected is connected. The picture element electrodes are arranged on the translucent substrate in matrix. On the other translucent substrate (i.e., a counter substrate), a color filter layer including color filters of red, green, and blue and a black matrix for preventing light leakage between these color filters is formed. On the color filter layer, a transparent conductive film functioning as a counter electrode for driving liquid crystal is laminated.

Further, on each of the active matrix substrate and the counter substrate, a liquid crystal alignment film made of polyimide or the like is formed under predetermined conditions, followed by an alignment treatment such as rubbing in accordance with a desired viewing angle. Then, a spacer such as plastic beads for forming a cell gap is arranged on one of the substrates, and an adhesive such as a thermosetting sealant is applied to the periphery of a display area on the other substrate. Thereafter, the active matrix substrate and the counter substrate are bonded together with the adhesive, and a liquid crystal material is injected between the substrates by a vacuum injection method or the like, followed by sealing of an injection port. In this manner, a liquid crystal display element is obtained. Meanwhile, a liquid crystal display is required to have display qualities such as high brightness, high contrast, high definition, and a wide viewing angle, which are being improved rapidly. In particular, a conventional TN (twisted nematic) mode, STS (super twisted nematic) mode, etc. are disadvantageous in that they lead to a narrow viewing angle. In order to overcome this disadvantage, liquid crystal modes capable of providing a wide viewing angle such as MVA (multi-domain vertical alignment), CPA (continuous pinwheel alignment), IPS (in-plane switching), FFS (fringe field switching), and OCB (optically compensated birefringence) are being developed. However, the development of such liquid crystal modes capable of providing a wide viewing angle has led to another problem.

That is, when a user observes a screen of a mobile personal computer, a PDA, a mobile phone, or the like having a wide viewing angle in public, the wide viewing angle allows others to look at the screen from a viewing angle other than the front direction for the user, e.g., from a lateral direction. This may result in a leakage of private information. Nowadays, combined with enforcement of the Personal Information Protection Law, there has been an increasing demand from users for privacy protection by making a viewing angle narrower contrary to a conventional tendency. To this end, it has been popular to attach a viewing angle adjusting film for making a viewing angle narrower to a screen, which, however, always makes the viewing angle narrower. Thus, it also has been demanded to switch dynamically between a wide viewing angle inherent in a display and a narrow viewing angle in favor of privacy protection according to need. In view of this, a display in which a viewing angle control device capable of switching dynamically between a wide viewing angle and a narrow viewing angle by using birefringence of liquid crystal is provided on a display device for displaying an image has been proposed.

Various systems of viewing angle control devices using liquid crystal have been proposed, such as a light dispersion system using polymer-dispersed liquid crystal (Japanese Patent No. 3481741 and JP 7(1995)-333640 A), a light absorption system using guest host liquid crystal (JP 10(1998)-197844 A), a TN mode (JP 10(1998)-268251 A) an IPS mode (JP 11(1999)-30783 A), a hybrid alignment mode (JP 2005-275342 A), and a homogeneous alignment mode OP 2005-316407 A).

In particular, a viewing angle control device using homogeneously aligned liquid crystal as disclosed in JP 2005-316407 A has many advantages such as a simple manufacturing process, capability of switching between a wide viewing angle and a narrow viewing angle, and relatively high transmittance in a normal direction. With reference to FIGS. 12A and 12B, a configuration of the viewing angle control device using the homogeneously aligned liquid crystal will be described. FIG. 12A is a schematic view showing a state of liquid crystal molecules during a wide viewing angle mode of the viewing angle control device, and FIG. 12B is a schematic view showing a state of the liquid crystal molecules during a narrow viewing angle mode of the viewing angle control device. In FIGS. 12A and 12B, reference numerals 91 and 92 denote a pair of translucent substrates, and reference numeral 93 denotes the liquid crystal molecules of a liquid crystal layer sandwiched between the translucent substrates 91 and 92. Arrows denoted by reference numerals 94 and 95 represent the polarization-transmission axes of polarizers laminated on the translucent substrates 91 and 92. The polarization-transmission axes 94 and 95 are parallel to each other. Alignment films on the translucent substrates 91 and 92 are subjected to a so-called antiparallel rubbing process in which the rubbing directions are substantially parallel to the polarization-transmission axes 94 and 95 and opposite to each other between the translucent substrates 91 and 92.

In this viewing angle control device, when no voltage is applied to the liquid crystal layer, the liquid crystal molecules 93 are oriented with their long molecular axes aligning substantially parallel to the polarization-transmission axes 94 and 95, as shown in FIG. 12A. Thus, even if a view point is inclined laterally with respect to the panel from the normal direction to the substrates (i.e., in a plane perpendicular to the polarization-transmission axes 94 and 95), no phase difference occurs in the liquid crystal layer, so that a display device on which the viewing angle control device is laminated can maintain a wide viewing angle. This state is referred to as a wide viewing angle state.

On the other hand, when a predetermined voltage is applied to the liquid crystal layer, the liquid crystal molecules 93 rise at an inclination angle θ with respect to the substrate surface in accordance with the applied voltage, as shown in FIG. 12B. Consequently, if a view point is inclined laterally with respect to the panel from the normal direction to the substrates, a phase difference occurs in the liquid crystal layer. When the inclination of the view point reaches a certain angle, a black display is provided depending on the VT (voltage-transmittance) characteristics, as shown in FIG. 13. Thus, a display of the display device is shielded by the black display of the viewing angle control device in the lateral direction other than the normal direction to the substrates (i.e., the front). This state is referred to as a narrow viewing angle state.

DISCLOSURE OF INVENTION

Problem to be Solved by the Invention

In the viewing angle control device using birefringence of the liquid crystal as described above, coloring occurs during the black display due to wavelength dispersion of the birefringence of the liquid crystal. More specifically, the refractive index of the liquid crystal varies depending on the wavelength of incident light. Therefore, when white light is incident and divided, e.g., into blue (with a wavelength of about 450 nm), green (with a wavelength of about 550 nm), and red (with a wavelength of about 650 nm) components, since the refractive index of the liquid crystal varies depending on the color, the red, blue, and green components differ from each other in the bottom of the VT characteristics (i.e., the voltage value at which a black display is provided), as shown in FIG. 14. Thus, the transmittance of each of the red, blue, and green components differs in accordance with the applied voltage, which may lead to coloring.

The present invention was made in view of the foregoing problem, and it is an object of the present invention to provide a viewing angle control device that includes a means for adjusting the VT characteristics of the viewing angle control device so as to achieve a black display without coloring in a narrow viewing angle state, and a display including the viewing angle control device.

Means for Solving Problem

To achieve the above-described object, a display of the present invention includes the following: a display device that includes a plurality of colors of picture elements, each of which is driven in accordance with an image to be displayed; and a viewing angle control device that is arranged on at least one of the back and the front of the display device and controls a viewing angle of the display device. The viewing angle control device includes the following: a pair of substrates, each of which includes at least an electrode and an alignment film; liquid crystal sandwiched between the pair of substrates; a driving circuit for applying a voltage to the electrodes provided on the pair of substrates; and a pair of polarizers provided so as to sandwich the pair of substrates therebetween. The driving circuit switches a voltage to be applied to the electrodes, thereby switching a range of the viewing angle in which a display of the display device can be viewed, between a first state providing a first viewing angle range and a second state providing a second viewing angle range that is within the first viewing angle range and narrower than the first viewing angle range. The electrode of at least one of the pair of substrates of the viewing angle control device is provided so that a portion corresponding to at least one color of the picture element of the display device is electrically independent of portions corresponding to the other colors of the picture elements. The driving circuit of the viewing angle control device applies an alternating-current voltage to the portion of the electrode corresponding to at least one color of the picture element of the display device so that a frequency of the alternating-current voltage differs from frequencies of alternating-current voltages applied to the portions of the electrode corresponding to the other colors of the picture elements, thereby adjusting the voltage-transmittance characteristics of the liquid crystal of the viewing angle control device.

When an alternating-current voltage is applied to the liquid crystal, the voltage-transmittance characteristics change with variations in frequency, even if the amplitude is the same. In the above configuration, the driving circuit of the viewing angle control device applies an alternating-current voltage to the portion of the electrode corresponding to at least one color of the picture element of the display device so that a frequency of the alternating-current voltage differs from frequencies of alternating-current voltages applied to the portions of the electrode corresponding to the other colors of the picture elements. Thus, the voltage-transmittance characteristics of the liquid crystal of the viewing angle control device can be adjusted in the portion corresponding to at least one color of the picture element of the display device. Therefore, by properly adjusting the frequencies of the alternating-current voltages applied to the portions of the electrode corresponding to each color of the picture elements of the display device, the bottoms of the VT characteristics (i.e., the voltage values at which a black display is provided) of the individual color components can coincide. Consequently, it is possible to provide a display that can achieve a pure black display without coloring and have a significantly improved shielding ability in the narrow viewing angle state.

In the above display, it is preferable that the plurality of colors of picture elements include three colors of picture elements that produce white when mixed, and the electrode of at least one of the pair of substrates of the viewing angle control device is provided so that portions corresponding to the three colors of the picture elements of the display device are electrically independent of one another. The three colors of the picture elements are preferably, e.g., red, green, and blue picture elements.

In the above display, it is preferable that fb<fg<fr is established, where fr, fg, and fb represent frequencies of alternating-current voltages applied from the driving circuit of the viewing angle control device to the portions of the electrode of the viewing angle control device that correspond to the red picture element, the green picture element, and the blue picture element, respectively.

In the above display, it is preferable that a liquid crystal layer of the viewing angle control device includes positive-type nematic liquid crystal, the polarization-transmission axes of the polarizers are arranged substantially parallel to rubbing directions of the alignment films, and the driving circuit applies no voltage to the liquid crystal layer and thus provides the first viewing angle range, and applies a predetermined voltage to the liquid crystal layer and thus provides the second viewing angle range.

In the above display, it is preferable that the alignment films provided on the pair of substrates of the viewing angle control device are subjected to a rubbing process in directions parallel and opposite to each other.

Moreover, to solve the above problem, a viewing angle control device of the present invention is arranged on at least one of the back and the front of a display device in which a plurality of colors of picture elements are driven in accordance with an image to be displayed, and that controls a viewing angle of the display device. The viewing angle control device includes the following: a pair of substrates, each of which includes at least an electrode and an alignment film; liquid crystal sandwiched between the pair of substrates; a driving circuit for applying a voltage to the electrodes provided on the pair of substrates; and a pair of polarizers provided so as to sandwich the pair of substrates therebetween. The driving circuit switches a voltage to be applied to the electrodes, thereby switching a range of the viewing angle in which a display of the display device can be viewed, between a first state providing a first viewing angle range and a second state providing a second viewing angle range that is within the first viewing angle range and narrower than the first viewing angle range. The electrode of at least one of the pair of substrates is provided so that a portion corresponding to at least one color of the picture element of the display device is electrically independent of portions corresponding to the other colors of the picture elements. The driving circuit applies an alternating-current voltage to the portion of the electrode corresponding to at least one color of the picture element of the display device so that a frequency of the alternating-current voltage differs from frequencies of alternating-current voltages applied to the portions of the electrode corresponding to the other colors of the picture elements, thereby adjusting the voltage-transmittance characteristics of the liquid crystal of the viewing angle control device.

With this configuration, by properly adjusting the frequencies of the alternating-current voltages applied to the portions of the electrode corresponding to each color of the picture elements of the display device, the bottoms of the VT characteristics (i.e., the voltage values at which a black display is provided) of the individual color components can coincide. Consequently, it is possible to provide a viewing angle control device that can achieve a pure black display without coloring and have a significantly improved shielding ability in the narrow viewing angle state.

EFFECTS OF THE INVENTION

The present invention can provide a viewing angle control device that can achieve a pure black display without coloring in the narrow viewing angle state and have a significantly improved shielding ability in the narrow viewing angle state, and a display using the viewing angle control device.

BRIEF DESCRIPTION OF DRAWINGS

FIG. 7 is a table comparing the characteristics between a viewing angle control liquid crystal panel of a comparative example and a viewing angle control liquid crystal panel of an example.

FIG. 12 is a schematic view showing a state of liquid crystal molecules in a conventional viewing angle control device.

DESCRIPTION OF THE INVENTION

Hereinafter, a specific embodiment of the present invention will be described with reference to the drawings. Each figure, which will be referred to in the following, shows only the main members required for describing the present invention among the constituent members of the embodiment of the present invention, in a simplified manner for convenience of explanation. Thus, a display according to the present invention can include any constituent members not shown in each figure. Further, the size and size ratio of the members in each figure do not exactly reflect those of the actual constituent members.

Figure 1:
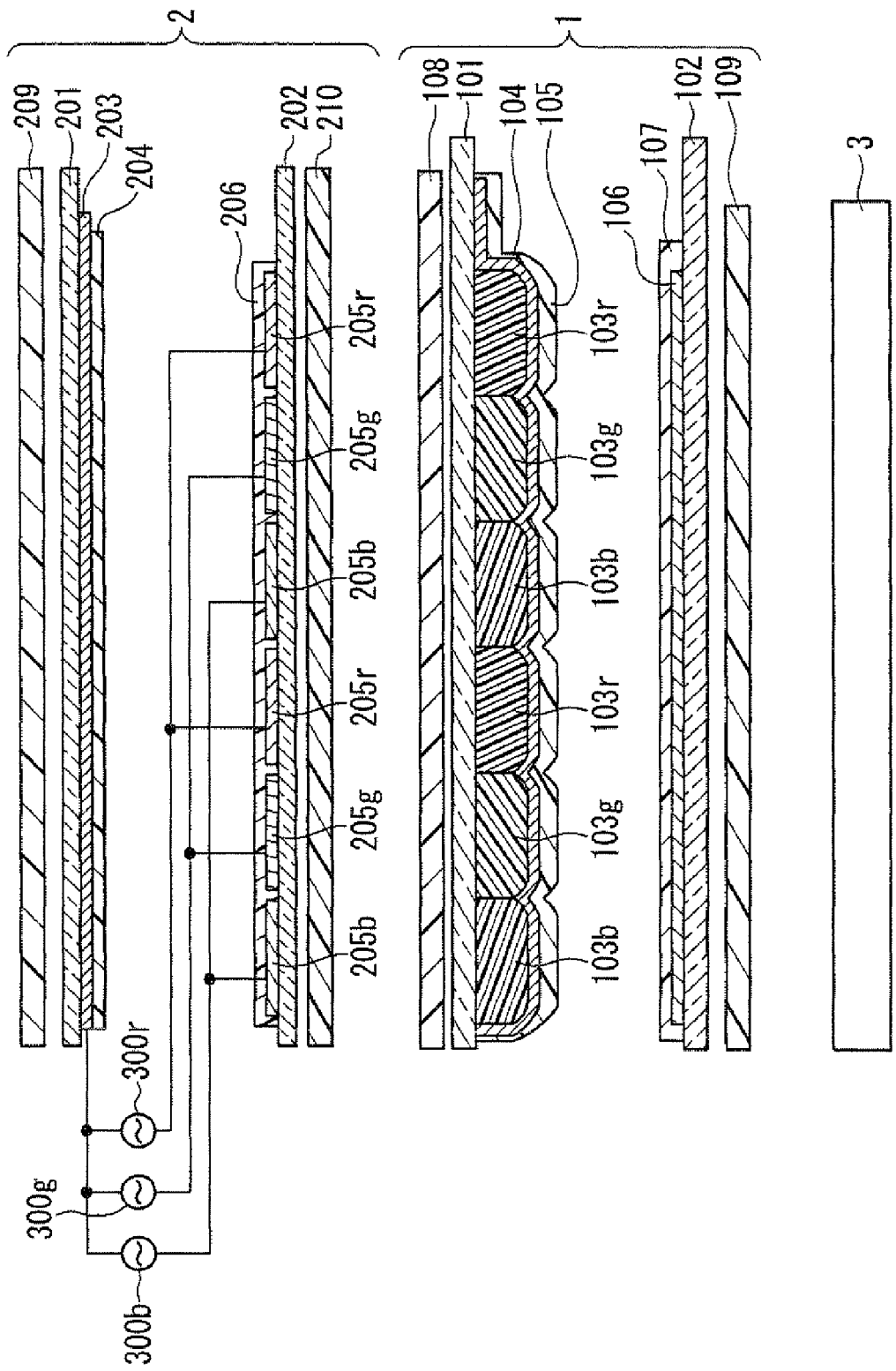
FIG. 1 is a schematic cross-sectional view showing a schematic configuration of a display of an embodiment of the present invention.

FIG. 1 is a schematic cross-sectional view showing a schematic configuration of a liquid crystal display of an embodiment of the present invention. As shown in FIG. 1, the liquid crystal display of this embodiment includes two liquid crystal panels: a display liquid crystal panel 1 (display device) for displaying an image and a viewing angle control liquid crystal panel 2 (viewing angle control device). The viewing angle control liquid crystal panel 2 of this embodiment is arranged on an observer side relative to the display liquid crystal panel 1. In the embodiment shown in FIG. 1, the display liquid crystal panel 1 is a transmission liquid crystal display device, and a backlight 3 is arranged on the back of the display liquid crystal panel 1. However, in the liquid crystal display to which the present invention is applied, the display liquid crystal panel 1 is not limited to the transmission liquid crystal display device and may be either a semi-transmission or a reflection liquid crystal panel. When the display liquid crystal panel 1 is a reflection liquid crystal panel, the backlight 3 is not necessary. In the embodiment shown in FIG. 1, the viewing angle control liquid crystal panel 2 is arranged on the front of the display liquid crystal panel 1. However, the viewing angle control liquid crystal panel 2 may be provided on the back of the display liquid crystal panel 1. Alternatively, one or more viewing angle control liquid crystal panels 2 may be provided on each of the back and the front of the display liquid crystal panel 1.

The display liquid crystal panel 1 is, e.g., an active matrix type liquid crystal display device and includes a liquid crystal material (not shown) sandwiched between a pair of translucent substrates 101 and 102. In FIG. 1, the translucent substrate 101 is a color filter substrate (counter substrate) and the translucent substrate 102 is an active matrix substrate. More specifically, on the translucent substrate 101, color filters 103, a translucent electrode film 104 functioning as a counter electrode, and an alignment film 105 are laminated. On the translucent substrate 102, active elements such as TFTs and signal lines and scanning lines for driving the active elements (which are not shown) are formed in a known manner. Further, a pixel electrode 106 patterned for each picture element and an alignment film 107 are provided. In the color filters 103 of the color filter substrate, red filters 103r, green filters 103g, and blue filters 103b are arranged in stripes in accordance with the arrangement of the picture elements on the active matrix substrate. Linear polarizers 108 and 109 are arranged on the outside of the translucent substrates 101 and 102, respectively.

The alignment films 105 and 107 are made of polyimide etc. The alignment films 105 and 107 are rubbed in a direction parallel to the stripes of the color filters 103 so that the rubbing direction of the alignment film 105 is parallel and opposite to that of the alignment film 107, namely so-called antiparallel rubbing. The linear polarizers 108 and 109 are arranged so that their transmission axes are parallel to the twisted alignment direction of the liquid crystal molecules. In this embodiment, the display mode of the display liquid crystal panel 1 is a twisted nematic mode, but may be as desired.

The viewing angle control liquid crystal panel 2 includes positive-type nematicliquid crystal (not shown) sandwiched between a pair of translucent substrates 201 and 202. A translucent electrode film 203 with a thickness of about 100 nm is formed by sputtering over the entire region of the translucent substrate 201 that corresponds to an active area (i.e., an area in which the effective picture elements are present) of the display liquid crystal panel 1.

On the translucent substrate 202, stripe-shaped translucent electrode films 205r, 205g, and 205b are formed in parallel to the color filters 103 (the red filters 103r, the green filters 103g, and the blue filters 103b) on the translucent substrate 101. As shown in FIG. 1, the translucent electrode films 205r are located at the positions opposite to the red filters 103r of the color filters 103 on the translucent substrate 101. The translucent electrode films 205g are located at the positions opposite to the green filters 103g. The translucent electrode films 205b are located at the positions opposite to the blue filters 103b. The translucent electrode films 205r, 205g, and 205b are electrically independent of one another, and alternating-current voltages with different frequencies are applied to them, as will be described later. The translucent electrode films 205r, 205g, and 205b are formed in the following manner. A translucent electrode film with a thickness of about 100 nm is formed on a region of the translucent substrate 202 that corresponds to the active area of the display liquid crystal panel 1 by sputtering. Subsequently, this film is patterned into stripes by photolithography so that the stripes are the same in shape as the red filters 103r, the green filters 103g, and the blue filters 103b, respectively.

As a material for the translucent electrode films 203, 205r, 205g, and 205b, e.g., ITO (indium tin oxide) is suitably used. However, the material is not limited thereto, and any material can be used as long as it has both translucency and conductivity.

An alignment film 204 is formed on the translucent electrode film 203, and an alignment film 206 is formed on the translucent electrode films 205r, 205g, and 205b. The alignment films 204 and 206 are made of polyimide etc. and subjected to a so-called antiparallel rubbing process in which the rubbing direction of the alignment film 204 is parallel and opposite to that of the alignment film 206. In this embodiment, the rubbing directions of the alignment films 204 and 206 are parallel to the stripes of the color filters 103 and the translucent electrode films 205r, 205g, and 205b (i.e., the normal direction to the surface of the sheet of FIG. 1).

Thus, the liquid crystal injected between the alignment films 204 and 206 is oriented with its long molecular axis aligning substantially parallel to the rubbing directions, which is so-called homogeneous alignment. When a predetermined voltage is applied between the translucent electrode films 203 and 205, the liquid crystal molecules rise such that their long molecular axes form a predetermined angle with the normal direction to the substrates. A pair of linear polarizers 209 and 210 are arranged on the outside of the translucent substrates 201 and 202 so that their transmission axes are substantially parallel to the rubbing directions of the alignment films 204 and 206, respectively.

Therefore, when no voltage is applied between the translucent electrode films 203 and 205, linearly polarized light that has passed through the display liquid crystal panel 1 and then through the linear polarizers 108 and 210 enters the liquid crystal layer of the viewing angle control liquid crystal panel 2. Subsequently, the light passes through the liquid crystal layer without being affected by birefringence of the liquid crystal molecules, further passes through the linear polarizer 209, and reaches the observer even if it is viewed obliquely from any viewing angle as well as from the normal direction to the substrates. Accordingly, when no voltage is applied between the translucent electrode films 203 and 205, the observer can view a display state of the display liquid crystal panel 1 from a wide viewing angle (i.e., the wide viewing state).

On the other hand, when a voltage is applied between the translucent electrode films 203 and 205, the liquid crystal molecules are arranged at an angle with respect to the normal direction to the substrates, as described above. Therefore, the light that passes obliquely through the liquid crystal layer of the viewing angle control liquid crystal panel 2 causes a phase difference due to the effect of birefringence of the liquid crystal molecules and cannot pass through the linear polarizer 209. Accordingly, when a voltage is applied between the translucent electrode films 203 and 205, the observer cannot view a display state of the display liquid crystal panel 1 from a direction that is inclined at a predetermined angle or more from the normal to the lateral direction of the panel (i.e., the narrow viewing angle state).

As described above, by switching ON/OFF of the voltage between the translucent electrode film 203 and the translucent electrode films 205b, 205g, and 205r of the viewing angle control liquid, crystal panel 2, switching control between the wide viewing angle state and the narrow viewing angle state can be performed. In FIG. 1, two linear polarizers (i.e., the linear polarizers 108 and 210) are disposed between the liquid crystal layer of the display liquid crystal panel 1 and the liquid crystal layer of the viewing angle control liquid crystal panel 2. However, if the linear polarizers 108 and 210 have substantially the same transmission-axial angle, one of the linear polarizers can be omitted.

The viewing angle control liquid crystal panel 2 of this embodiment includes alternating-current drive voltage generators 300b, 300g, and 300r for applying alternating-current voltages with different frequencies to the translucent electrode films 205b, 205g, and 205r, respectively. The alternating-current drive voltage generators 300b, 300g, and 300r may be configured, e.g., by forming at least one of the circuit components (i.e., the circuits represented by 301 to 307 in FIG. 2) on the translucent substrate 202 using a semiconductor process. Alternatively, the alternating-current drive voltage generators 300b, 300g, and 300r may be a circuit assembly including a semiconductor chip that is to be mounted on the translucent substrate 202 later.

Figure 2:
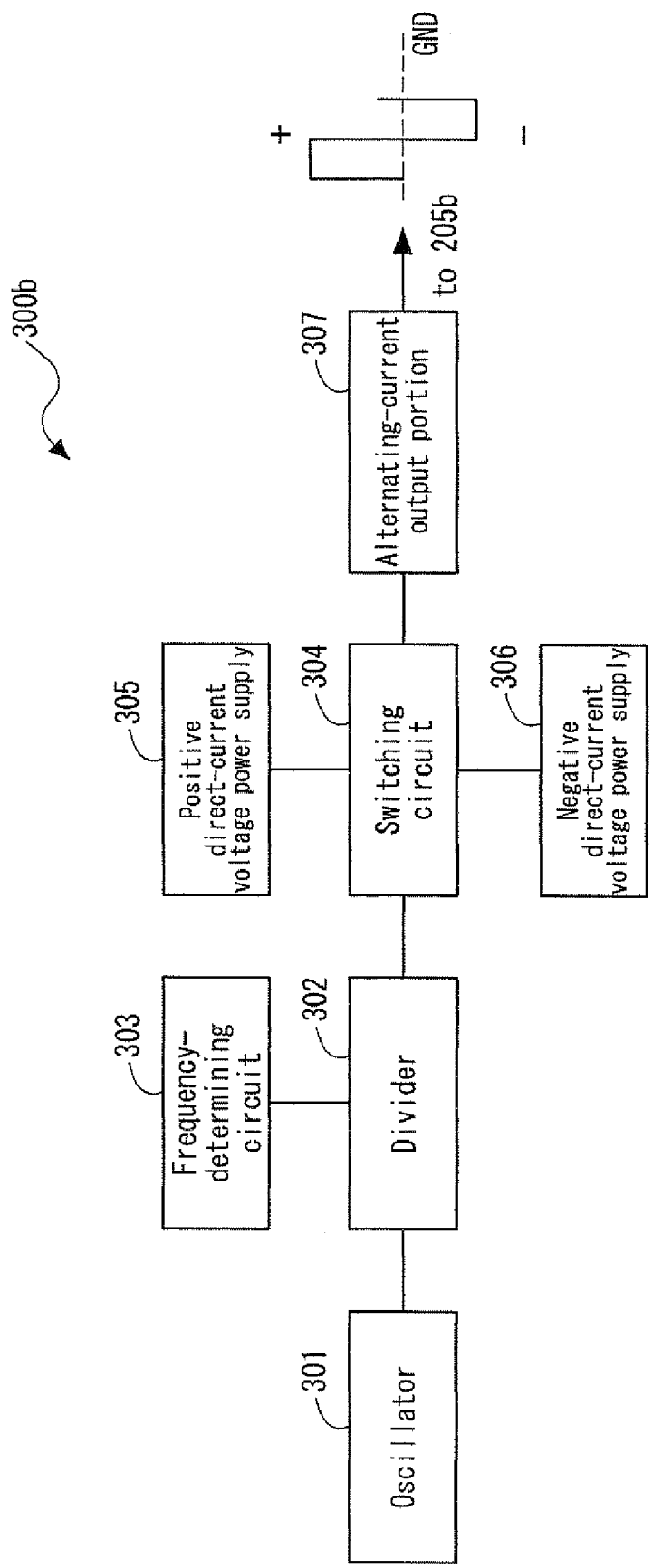
FIG. 2 is a block diagram showing an example of a configuration of an alternating-current drive voltage generator included in a viewing angle control liquid crystal panel of an embodiment of the present invention.

Hereinafter, the schematic configurations of the alternating-current drive voltage generators 300b, 300g, and 300r will be described with reference to FIG. 2. Since the alternating-current drive voltage generators 300b, 300g, and 300r have the same configuration, only the alternating-current drive voltage generator 300b is illustrated in FIG. 2. As shown in FIG. 2, the alternating-current drive voltage generator 300b includes an oscillator 301, a divider 302, a frequency-determining circuit 303, a switching circuit 304, a positive direct-current voltage power supply 305, a negative direct-current voltage power supply 306, and an alternating-current output portion 307.

The oscillator generates a reference dock. In this embodiment, the frequency of the reference clock is 33.333 MHz. The reference dock is input to the divider 302. The frequency-determining circuit 303 is connected to the divider 302, and an internal switch of the frequency-determining circuit 303 can change the reference clock to any frequency in the divider 302. In this embodiment, the dock frequency output from the divider 302 is set in the range of 30 Hz to 100 KHz at which the VT characteristics of the liquid crystal layer of the viewing angle control liquid crystal panel 2 indicate the frequency dependence. It is preferable that the upper limit (100 KHz in this example) of the clock frequency output from the divider 302 falls in the range where the dielectric anisotropy of the liquid crystal material is not eliminated.

The switching circuit 304 is composed of a CMOS transistor etc. The switching circuit 304 switches a positive direct-current voltage supplied from the positive direct-current voltage power supply 305 and a negative direct-current voltage supplied from the negative direct-current voltage power supply 306 on the time series in synchronization with the clock output from the divider 302. Thus, the switching circuit 304 generates a square-wave alternating-current voltage that has a frequency corresponding to the clock and an amplitude of the direct-current voltage value. In this embodiment, although the switching circuit 304 generates a square-wave voltage, the voltage waveform is not limited to a square. The alternating-current output portion 307 outputs the alternating-current voltage generated by the switching circuit 304 to the translucent electrode films 205b.

As described above, the alternating-current drive voltage generators 300b, 300g, and 300r are the same in configuration as shown in FIG. 2, but are different in the frequency of a dock generated by the divider 302.

Hereinafter, a method for determining clock frequencies of the alternating-current drive voltage generators 300b, 300g, and 300r will be described.

Figure 3:
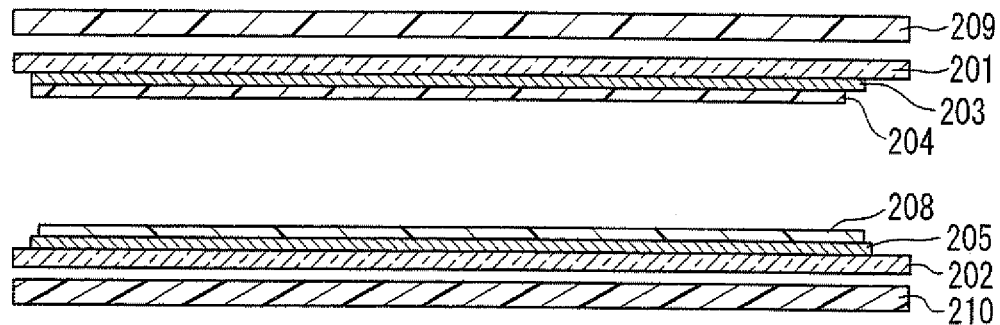
FIG. 3 is a cross-sectional view showing a schematic configuration of a prototype panel of a comparative example of the present invention.

First, a viewing angle control liquid crystal panel having the same structure as that of the viewing angle control liquid crystal panel 2 of this embodiment except that a translucent electrode film on the translucent substrate 202 is not patterned is prototyped (referred to as a "prototype panel" in the following). FIG. 3 shows a schematic configuration of the prototype panel. In FIG. 3, the same components as those of the viewing angle control liquid crystal panel 2 shown in FIG. 1 are denoted by the same reference numerals as those of FIG. 1. In the prototype panel shown in FIG. 3, a translucent electrode film 205 with a thickness of about 100 nm is formed by sputtering over the entire region of the surface of the translucent substrate 202 that corresponds to an active area (i.e., an area in which the effective picture elements are present) of the display liquid crystal panel 1.

Using this prototype panel, the VT characteristics are measured for each color of red ($\lambda$=650 nm), green ($\lambda$=550 nm), and blue ($\lambda$=450 nm) from a viewing angle (e.g., a direction that is inclined at 50° from the normal to the lateral direction of the panel) at which the display state is intended to be switched between two states, i.e., display and non-display by the viewing angle control liquid crystal panel 2. In this case, an alternating-current voltage with a constant frequency is applied between the translucent electrode films 203 and 205. This frequency is preferably set in the range of 30 Hz to 1 KHz. In this embodiment, the frequency is 1 KHz.

By applying the alternating-current voltage while varying the voltage value but maintaining the frequency constant, as described above, a voltage at which the transmittance is minimum (referred to as a "minimum transmittance voltage" in the following) is determined for each of red, green, and blue wavelength components. In this case, the minimum transmittance voltage for the red wavelength component is represented by Vmin(r), the minimum transmittance voltage for the green wavelength component is represented by Vmin(g), and the minimum transmittance voltage for the blue wavelength component is represented by Vmin(b). The highest voltage value among Vmin(r), Vmin(g), and Vmin(b) is defined as a reference voltage VST.

Next, frequency dependence of the minimum transmittance voltages of the liquid crystal used for the viewing angle control liquid crystal panel 2 is measured. This measurement also uses the prototype panel, and two colors other than the color that defines the reference voltage VST are employed as wavelengths of light during the measurement. Specifically, when the minimum transmittance voltage Vmin(b) for the blue wavelength component is the reference voltage VST, the frequency dependence of the minimum transmittance voltages for the green and red wavelength components is measured. The measurement is performed in the following manner. With the prototype panel, the display state is observed from a viewing angle (e.g., a direction that is inclined at 50° from the normal to the lateral direction of the panel) at which the display state is intended to be switched between two states, i.e., display and non-display by the viewing angle control liquid crystal panel 2, and then the minimum transmittance voltage of each color component at this viewing angle is determined while varying the frequency.

Figure 4:
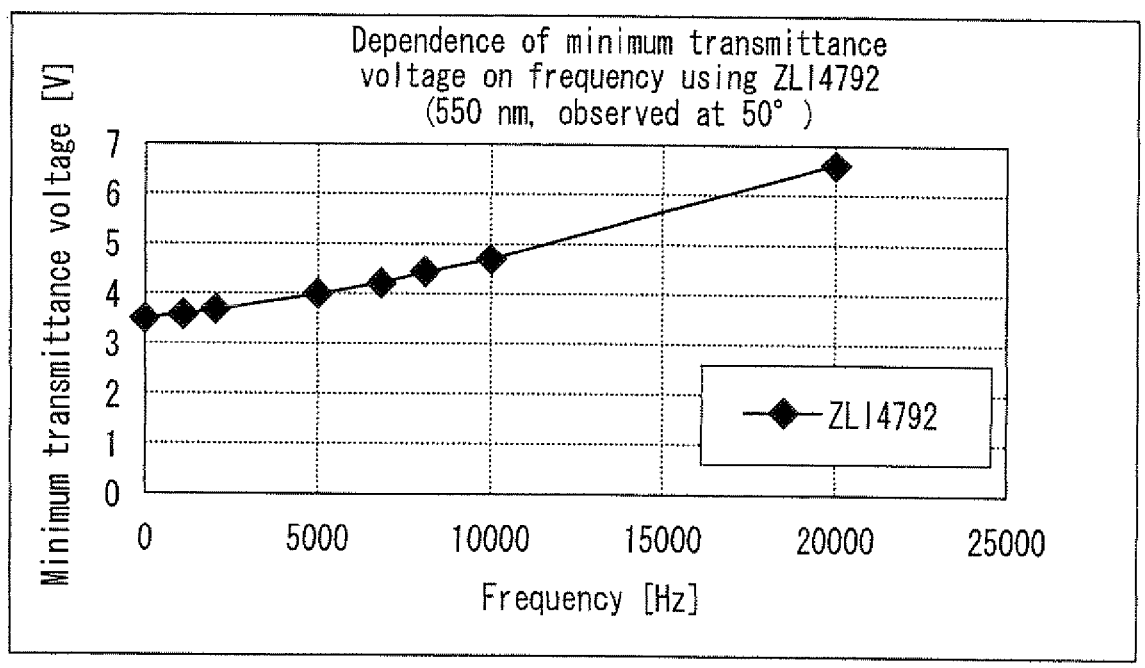
FIG. 4 is a graph showing the relationship between the frequency of an applied voltage to liquid crystal and the minimum transmission voltage for a green wavelength component ($\lambda$=550 nm) when ZLI4792 (trade name) manufactured by Merck Ltd. is used as a liquid crystal material.

For example, FIG. 4 is a graph showing the relationship between the frequency of an applied voltage to liquid crystal and the minimum transmittance voltage for a green wavelength component (λ=550 nm) when ZLI4792 (trade name) manufactured by Merck Ltd. is used as a liquid crystal material. As shown in FIG. 4, the value of the minimum transmittance voltage changes with the frequency of the applied voltage to the liquid crystal. In this embodiment, the frequencies of the applied voltages to the translucent electrode films 205r, 205g, and 205b are determined based on the frequency-minimum transmittance voltage characteristics thus measured. For example, the frequency of the applied voltage to the translucent electrode films 205g corresponding to the green picture elements is determined as a frequency at which the minimum transmittance voltage is equal to the reference voltage VST in FIG. 4. In this example, since the reference voltage VST is 3.9 V, the frequency of the applied voltage to the translucent electrode films 205g corresponding to the green picture elements is approximately determined as 5 KHz. Similarly, the frequency of the applied voltage to the translucent electrode films 205r corresponding to the red picture elements is determined as 6.75 KHz. The frequency of the applied voltage to the translucent electrode films 205b corresponding to the blue picture elements is the frequency (1 KHz in this example) that has been used to determine the minimum transmittance voltages for the red, green, and blue wavelength components, as described above.

Thus, in the viewing angle control liquid crystal panel 2 of this embodiment, the alternating-current voltages with different frequencies are applied to the translucent electrode films 205r, 205g, and 205b, respectively.

In the viewing angle control liquid crystal panel 2 of this embodiment, when the frequencies of the alternating-current voltages applied to the translucent electrode films 205r, 205g, and 205b are represented by fr, fg, and fb, respectively, the relationship fb<fg<fr is established. The reason for this is described below.

The viewing angle control liquid crystal panel 2 switches between the wide viewing angle state and the narrow viewing angle state by electrically controlled birefringence (a so-called ECB mode) of the liquid crystal. In the viewing angle control liquid crystal panel 2, as described above, the linear polarizers 209 and 210 are arranged so that their transmission axes are parallel (so-called parallel Assuming that the frequency of the voltage applied to the liquid crystal is constant, the relationship expressed by the following formula (1) is generally established with respect to transmitted light intensity T when the parallel-Nicol polarizers are used In the formula (1), d represents a cell thickness, Δn(V) represents a birefringence of the liquid crystal as a function of the voltage (V), and λ represents a wavelength of incident light.

$$T \propto \cos^2(\pi \times d \times \Delta n(V)/\lambda) \quad (1)$$

The formula (1) shows that the transmitted light intensity T varies depending on the magnitude of the voltage V.

With respect to the birefringence Δn of the liquid crystal, the following relational expression (2) is established between a value Δn(R) for the red wavelength component, a value Δn(G) for the green wavelength component, and a value Δn(B) for the blue wavelength component.

$$\Delta n(R) < \Delta n(G) < \Delta n(B) \quad (2)$$

Moreover, the following relational expression (3) is established between the wavelengths λ(R), λ(G), and λ(B) of the color components.

$$\lambda(B) < \lambda(G) < \lambda(R) \quad (3)$$

In this case, since d is constant, the following relational expression (4) is established based on the relational expressions (2) and (3).

$$d\Delta n(R)/\lambda(R) < d\Delta n(G)/\lambda(G) < d\Delta n(B)/\lambda(B) \quad (4)$$

When a voltage is applied to the ECB mode liquid crystal, the liquid crystal molecules rise such that their long axis directions are close to the normal to the substrates. Consequently, the value of d×Δn/λ is reduced.

That is, based on the relational expression (4), the following relational expression (5) is established between the voltages $V_{T=0}(R)$, $V_{T=0}(G)$, and $V_{T=0}(B)$ at which the transmitted light intensity T of each color component is 0. The relational expression (5) can be read from FIG. 5 (comparative example), as will be described later.

$$V_{T=0}(R) < V_{T=0}(G) < V_{T=0}(B) \quad (5)$$

The above explanation of the characteristics are based on the assumption that the frequency of the drive voltage for each of the R, G, and B picture elements is constant. This embodiment allows the VT characteristics of the picture elements to differ from color to color, thereby making the value of the drive voltage for minimizing the transmittance the same. Therefore, the highest voltage $V_{T=0}(B)$ in the relational expression (5) is used as the reference, and the values of $V_{T=0}(R)$ and $V_{T=0}(G)$ are shifted to be the same as $V_{T=0}(B)$.

In this case, $V_{T=0}(R)$ is lower than $V_{T=0}(G)$, as shown in the relational expression (5). Accordingly, if these voltage values are shifted to be the same as $V_{T=0}(B)$, the amount of shift of the drive voltage $V_R$ applied to the red picture elements needs to be larger than that of the drive voltage $V_G$ applied to the green picture elements. Thus, the frequency fr of the alternating-current voltage applied to the translucent electrode films 205r corresponding to the red picture elements needs to be larger than the frequency fg of the alternating-current voltage applied to the translucent electrode films 205g corresponding to the green picture elements. For this reason, the following relational expression (6) is established between fb, fg, and fr.

$$fb < fg < fr \quad (6)$$

Hereinafter, an example of the viewing angle control liquid crystal panel 2 of this embodiment will be described. In this example, an ITO film with a thickness of about 100 nm was used as the translucent electrode films 203, 205r, 205g, and 205b. Moreover, the drive frequencies of the applied voltages to the translucent electrode films 205r, 205g, and 205b were 6.75 KHz, 5 KHz, and 1 KHz, respectively, as described above.

A polyimide film SE510 (trade name) manufactured by NISSAN CHEMICAL INDUSTRIES, LTD. was used as the alignment films 204 and 206. The alignment films were printed on the transparent conductive films by offset printing. After the printing, the alignment films were pre-baked at 70° C. for 5 minutes, and then post-baked at 250° C. for 60 minutes using a hot plate, so that the alignment films 204 and 206 were formed. The material for the alignment films 204 and 206 is not limited to polyimide. For example, an organic film of PVA (polyvinyl alcohol) or the like and an inorganic film of SiO or the like may be used. In this embodiment, the ali gnment films 204 and 206 were subjected to an alignment treatment by rubbing. Using a rayon cloth YA-18R (trade name) manufactured by YOSHIKAWA CHEMICAL CO., LTD. as a rubbing cloth, the rubbing process was performed three times by a rubbing device having a roller with a diameter of 150 mm under the following conditions: the pile contact length was 0.6 mm; the stage speed was 150 min/sec; and the number of revolutions of the roller was 250 rpm. The rubbing process was performed in a direction parallel to the stripes of the color filters 103 so that the rubbing direction of the alignment film 204 was parallel and opposite to that of the alignment film 206, namely so-called antiparallel rubbing.

After the rubbing process, a spacer was formed on the translucent substrate 202 to make the cell thickness uniform. In this example, 150 to 200 plastic beads SP-2069 (trade name, diameter: 6.9 μm) manufactured by SEKISUI CHEMICAL CO., LTD. were dry-sprayed per 1 mm$^2$. A thermosetting seal resin (not shown) was applied to the periphery of the translucent electrode film 203 on the translucent substrate 201 by screen printing. In this example, the thermosetting seal resin was XN21 (trade name) manufactured by Mitsui Chemicals Inc. After the application of the seal, the translucent substrate 201 was pre-baked at 85° C. for 20 minutes using a hot plate and arranged opposite to the translucent substrate 202 on which the spacer was sprayed. These substrates were pressed at low pressure and in alignment with each other, and then sandwiched by a press jig and fully pressed at high pressure. Subsequently, the resultant product was fully baked at 180° C. for 2 hours in an oven while maintaining the jig pressure. After the main baking, a liquid crystal material was injected into a cell gap by a vacuum injection method, and the injection port was sealed with an ultraviolet curable resin. In this example, the liquid crystal material was ZLI4792 (trade name) manufactured by Merck Ltd.

The linear polarizer 209 and 210 were attached to the outsides of the translucent substrates 201 and 202 so that their transmission axes were substantially parallel to the rubbing directions of the alignment films 204 and 206, respectively. In this manner, the viewing angle control liquid crystal panel of an example of the present invention was obtained. The constituent materials and the manufacturing conditions of this viewing angle control liquid crystal panel are merely examples, and the present invention is not limited thereto.

A comparative example was prepared to compare with the viewing angle control liquid crystal panel 2 of the present example. A viewing angle control liquid crystal panel of the comparative example had the same structure as that of the viewing angle control liquid crystal panel 2 of the present example except that the translucent electrode film 205 on the translucent substrate 202 was not patterned, and an alternating-current voltage with a constant frequency was applied between the translucent electrode films 203 and 205, as in the case of the prototype panel shown in FIG. 3. The frequency of the alternating-current voltage applied between the translucent electrode films 203 and 205 was 1 KHz. Like the viewing angle control liquid crystal panel 2 of the present example, the viewing angle control liquid crystal panel of the comparative example used ZLI4792 (trade name) manufactured by Merck Ltd. as a liquid crystal material and had a cell thickness of 6.9 μm.

Figure 5:
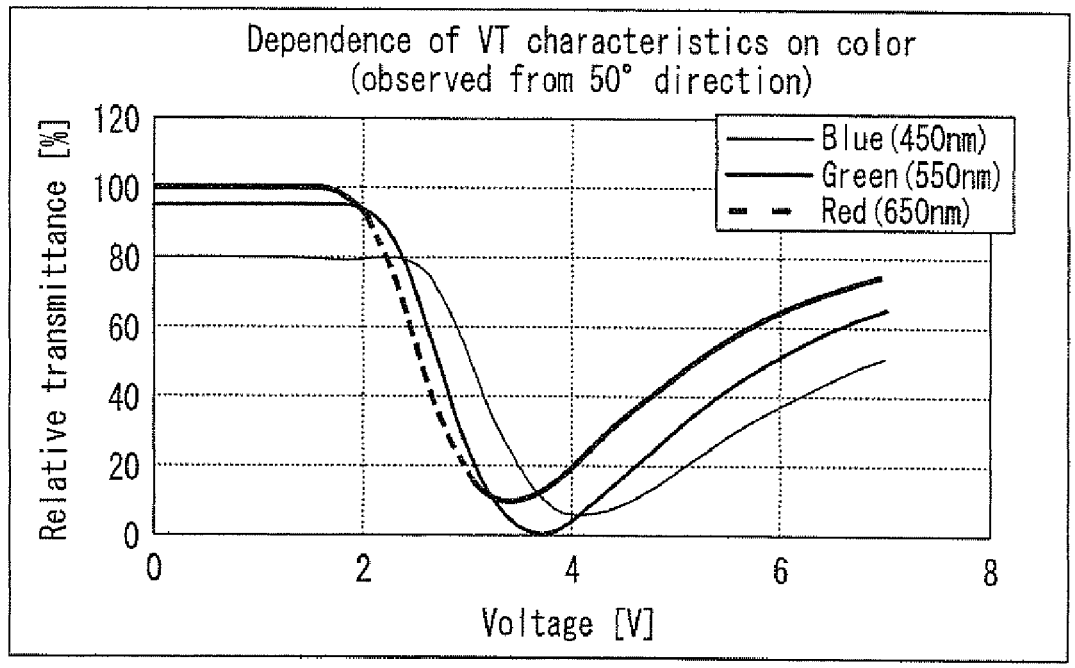
FIG. 5 is a graph showing the VT characteristics of each color component when a viewing angle control liquid crystal panel of a comparative example is viewed from an oblique direction.

FIG. 5 shows the VT characteristics of each color component of the viewing angle control liquid crystal panel of the comparative example. As shown in FIG. 5, in the viewing angle control liquid crystal panel of the comparative example, the red, green, and blue components differ from each other in the minimum transmittance voltage of the VT characteristics. In general, the drive voltage of the viewing angle control liquid crystal panel in the narrow viewing angle mode is set to the minimum transmittance voltage for the green component so as to suppress the transmittance of green light having the highest luminosity factor for the human eyes. Therefore, the drive voltage of the viewing angle control liquid crystal panel of the comparative example was 3.5 V.

Figure 6:
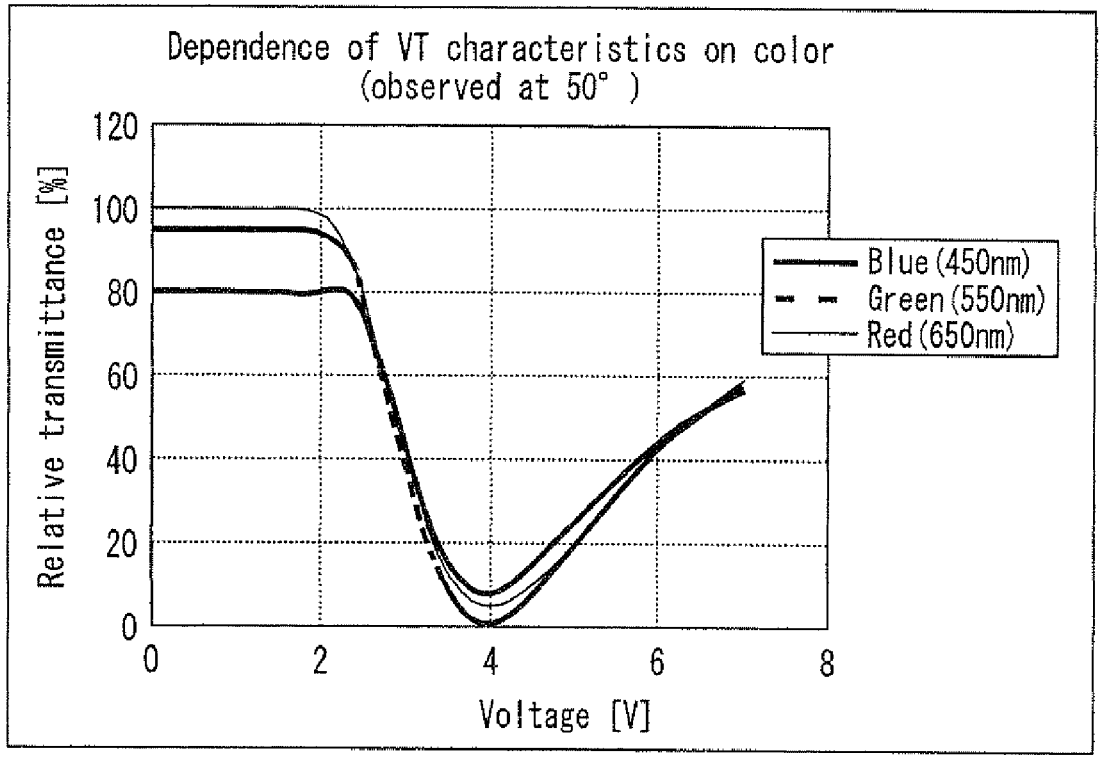
FIG. 6 is a graph showing the VT characteristics of a viewing angle control liquid crystal panel of an embodiment of the present invention.

FIG. 6 is a graph showing the VT characteristics of each color component when the viewing angle control liquid crystal panel 2 of this example of the present invention was viewed from an oblique direction (i.e., a direction that is inclined at 50° from the normal to the lateral direction of the panel). In FIG. 6, the "relative transmittance" is a value obtained by defining the transmittance of the red wavelength component (650 nm) when no voltage is applied to the viewing angle control liquid crystal panel 2 as 100. As shown in FIG. 6, in the viewing angle control liquid crystal panel 2 of the present example, the minimum transmittance voltages of the VT characteristics of the red, green, and blue components were standardized to 3.9 V, since the drive frequencies of the applied voltages to the translucent electrode films 205r, 205g, and 205b were set to 6.75 KHz, 5 KHz, and 1 KHz, respectively, as described above.

FIG. 7 is a table comparing the characteristics between the viewing angle control liquid crystal panel of the comparative example and the viewing angle control liquid crystal panel of the present example. As can be seen from FIG. 7, in the viewing angle control liquid crystal panel of the comparative example, since the transmittance of the blue component was relatively high in the narrow viewing angle state, the display contents on the display liquid crystal panel 1 were viewed in a slightly bluish state. On the other hand, as can be seen from FIG. 7, in the viewing angle control liquid crystal panel 2 of the present example, the transmittance of each color component in the narrow viewing angle state was lower than that in the comparative example. Therefore, the application of 3.9 V to the viewing angle control liquid crystal panel 2 of the present example resulted in an almost completely uniform black display when the panel was viewed from a direction that was inclined at 50° or more from the normal to the lateral direction of the panel. Thus, the displayed contents on the display liquid crystal panel 1 were not viewed.

As described above, this embodiment can achieve an almost completely uniform black display in the narrow viewing angle state using the viewing angle control liquid crystal panel 2, and thus can provide a liquid crystal display having a significantly improved shielding ability in the narrow viewing angle state.

The above specific example is merely an embodiment of the present invention and can be variously modified within the scope of the present invention.

For example, in the above specific example, only the translucent electrode film on the translucent substrate 202 is patterned into stripes. However, the translucent electrode film on the translucent substrate 201 also may be patterned in the same manner. Moreover, in the above specific example, the translucent electrode film is patterned so that the portions corresponding to three colors of the picture elements are electrically independent of one another. However, the translucent electrode film may be patterned so that the portion corresponding to one color of the picture element is electrically independent of the portions corresponding to the other two colors of the picture elements.

In the above embodiment, the viewing angle control liquid crystal panel includes homogeneously aligned liquid crystal. However, the liquid crystal of the viewing angle control device of the present invention is not limited to a homogeneous alignment. That is, any liquid crystal mode is applicable to the present invention as long as the panel can switch between the wide viewing angle state and the narrow viewing angle state by utilizing birefringence of the liquid crystal.

In the above embodiment, each pixel of the display liquid crystal panel 1 is composed of three primary colors (red, blue, and green) of picture elements. However, the present invention also includes an embodiment in which each pixel of the display liquid crystal panel 1 is composed of four or more colors of picture elements by adding a picture element of any color other than the three primary colors. In this case, in the viewing angle control liquid crystal panel 2, the translucent electrode film on at least one of the translucent substrates 201 and 202 is patterned so that drive voltages with different frequencies depending on the color of the additional picture element are applied to the portions corresponding to the picture elements of any color other than the three primary colors. Some specific examples in which one pixel is composed of four or more picture elements will be described in the following.

Figure 8:
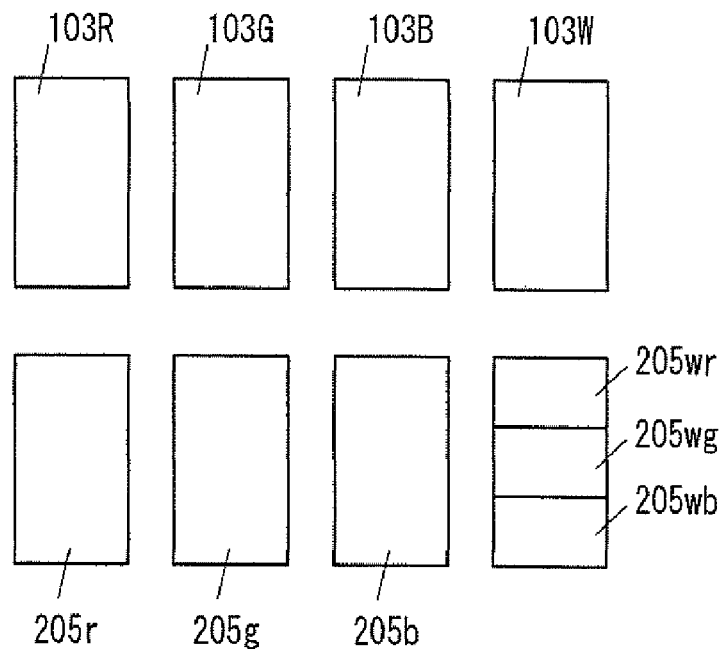
FIG. 8 is a schematic view showing a positional relationship between the picture elements of a display liquid crystal panel and the translucent electrode films of a viewing angle control device in a modified example of a display of the present invention.

For example, in the display liquid crystal panel 1, each pixel may be composed of a total of four colors of picture elements, i.e., three primary colors (red (R), blue (B), and green (G)) of picture elements and a white (W) picture element. In this case, as shown in FIG. 8, the color filters 103 of the display liquid crystal panel 1 include a red filter 103R, a green filter 103G, a blue filter 103B, and a white filter 103W that are arranged in stripes. However, the sequence and the relative positional relationship of the color filters are not limited to those shown in FIG. 8. In this case, as shown in FIG. 8, the translucent electrode film 205 of the viewing angle control liquid crystal panel 2 is patterned so that the translucent electrode films 205r, 205g, and 205b are independent of one another and arranged at the positions corresponding to the red picture element (red filter 103R), the green picture element (green filter 103G), and the blue picture element (blue filter 103B) of the display liquid crystal panel 1, respectively. Moreover, a portion of the translucent electrode film 205 that corresponds to the white picture element (white filter 103W) is divided into three substantially equal regions (sub-electrodes 205wr, 205wg, and 205wb). The three sub-electrodes 205wr, 205wg, and 205wb are patterned to be electrically independent of one another. Although not shown in FIG. 8, the sub-electrode 205wr as well as the translucent electrode film 205r is connected to the alternating-current drive voltage generator 300r. The sub-electrode 205wg as well as the translucent electrode film 205g is connected to the alternating-current drive voltage generator 300g. The sub-electrode 205wb as well as the translucent electrode film 205b is connected to the alternating-current drive voltage generator 300b. The sub-electrodes 205wr, 205wg, and 205wb corresponding to the white picture element may be arranged in any order.

As described above, the sub-electrodes 205wr, 205wg, and 205wb driven by the alternating-current drive voltage generators 300r, 300g, and 300b are also patterned in the portion corresponding to the white picture element (white filter 103W). Accordingly, when the viewing angle control liquid crystal panel 2 is in the narrow viewing angle state, coloring of light that passes through the portion corresponding to the white picture element can be suppressed, and a pure black display can be achieved.

Figure 9:
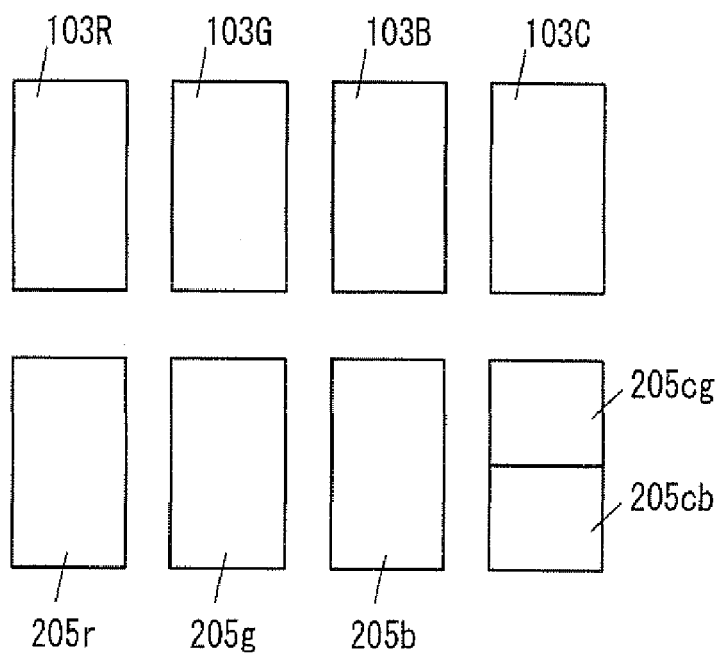
FIG. 9 is a schematic view showing a positional relationship between the picture elements of a display liquid crystal panel and the translucent electrode films of a viewing angle control device in a modified example of a display of the present invention.

As shown in FIG. 9, in the display liquid crystal panel 1, each pixel may be composed of a total of four colors of picture elements, i.e., three primary colors (red (R), blue (B), and green (G)) of picture elements and a cyan (C) picture element. In this case, as shown in FIG. 9, the color filters 103 of the display liquid crystal panel 1 include a red filter 103R, a green filter 103G, a blue filter 103B, and a cyan filter 103C that are arranged in stripes. However, the sequence and the relative positional relationship of the color filters are not limited to those shown in FIG. 9. In this case, as shown in FIG. 9, the translucent electrode film 205 of the viewing angle control liquid crystal panel 2 is patterned so that the translucent electrode films 205r, 205g, and 205b are independent of one another and arranged at the positions corresponding to the red picture element (red filter 103R), the green picture element (green filter 103G), and the blue picture element (blue filter 103B) of the display liquid crystal panel 1, respectively. Moreover, a portion of the translucent electrode film 205 that corresponds to the cyan picture element (cyan filter 103C) is divided into two substantially equal regions (sub-electrodes 205cg and 205cb). The two sub-electrodes 205cg and 205cb are patterned to be electrically independent of each other. Although not shown in FIG. 9, the sub-electrode 205cg as well as the translucent electrode film 205g is connected to the alternating-current drive voltage generator 300g. The sub-electrode 205cb as well as the translucent electrode film 205b is connected to the alternating-current drive voltage generator 300b. The sub-electrodes 205cg and 205cb corresponding to the cyan picture element may be arranged in any order.

As described above, the sub-electrodes 205cg and 205cb driven by the alternating-current drive voltage generators 300g and 300b are also patterned in the portion corresponding to the cyan picture element (cyan filter 103C). Accordingly, when the viewing angle control liquid crystal panel 2 is in the narrow viewing angle state, coloring of light that passes through the portion corresponding to the cyan picture element can be suppressed, and a pure black display can be achieved.

Figure 10:
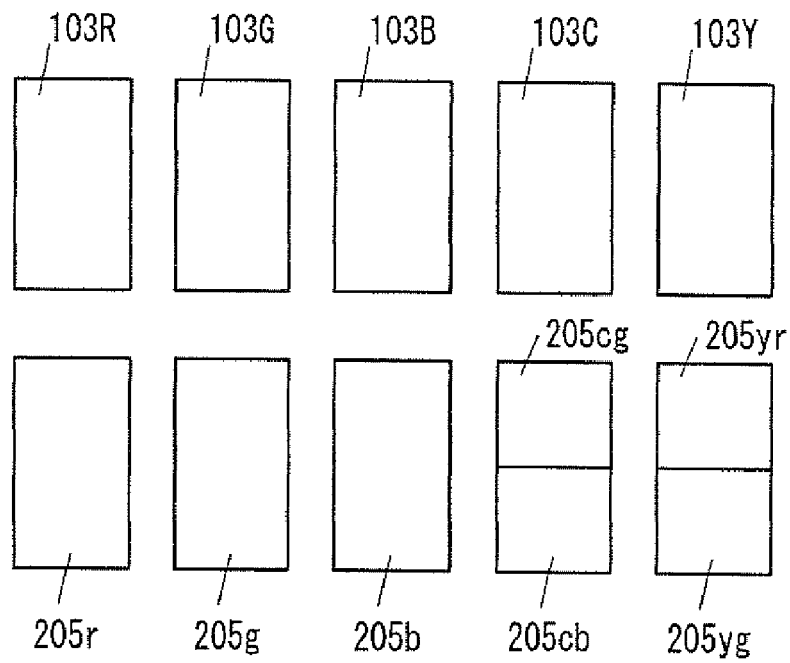
FIG. 10 is a schematic view showing a positional relationship between the picture elements of a display liquid crystal panel and the translucent electrode films of a viewing angle control device in a modified example of a display of the present invention.

As shown in FIG. 10, in the display liquid crystal panel 1, each pixel may be composed of a total of five colors of picture elements, i.e., three primary colors (red (R), blue (B), and green (G)) of picture elements, a cyan (C) picture element, and a yellow (Y) picture element. In this case, as shown in FIG. 10, the color filters 103 of the display liquid crystal panel 1 include a red filter 103R, a green filter 103G, a blue filter 103B, a cyan filter 103C, and a yellow filter 103Y that are arranged in stripes. However, the sequence and the relative positional relationship of the color filters are not limited to those shown in FIG. 10. In this case, as shown in FIG. 10, the translucent electrode film 205 of the viewing angle control liquid crystal panel 2 is patterned so that the translucent electrode films 205r, 205g, and 205b are independent of one another and arranged at the positions corresponding to the red picture element (red filter 103R), the green picture element (green filter 103G), and the blue picture element (blue filter 103B) of the display liquid crystal panel 1, respectively. Moreover, a portion of the translucent electrode film 205 that corresponds to the cyan picture element (cyan filter 103C) is divided into two substantially equal regions (sub-electrodes 205cg and 205cb). The two sub-electrodes 205cg and 205cb are patterned to be electrically independent of each other. Further, a portion of the translucent electrode film 205 that corresponds to the yellow picture element (yellow filter 103Y) is divided into two substantially equal regions (sub-electrodes 205yr and 205yg). The two sub-electrodes 205yr and 205yg are patterned to be electrically independent of each other. Although not shown in FIG. 10, the sub-electrodes 205cg and 205yg as well as the translucent electrode film 205g are connected to the alternating-current drive voltage generator 300g. The sub-electrode 205cb as well as the translucent electrode film 205b is connected to the alternating-current drive voltage generator 300b. The sub-electrode 205yr as well as the translucent electrode film 205r is connected to the alternating-current drive voltage generator 300r.

As described above, the sub-electrodes 205yr and 205yg driven by the alternating-current drive voltage generators 300r and 300g are also patterned in the portion corresponding to the yellow picture element (yellow filter 103Y). Accordingly, when the viewing angle control liquid crystal panel 2 is in the narrow viewing an angle state, coloring of light that passes through the portion corresponding to the yellow picture element can be suppressed, and a pure black display can be achieved.

Figure 11:
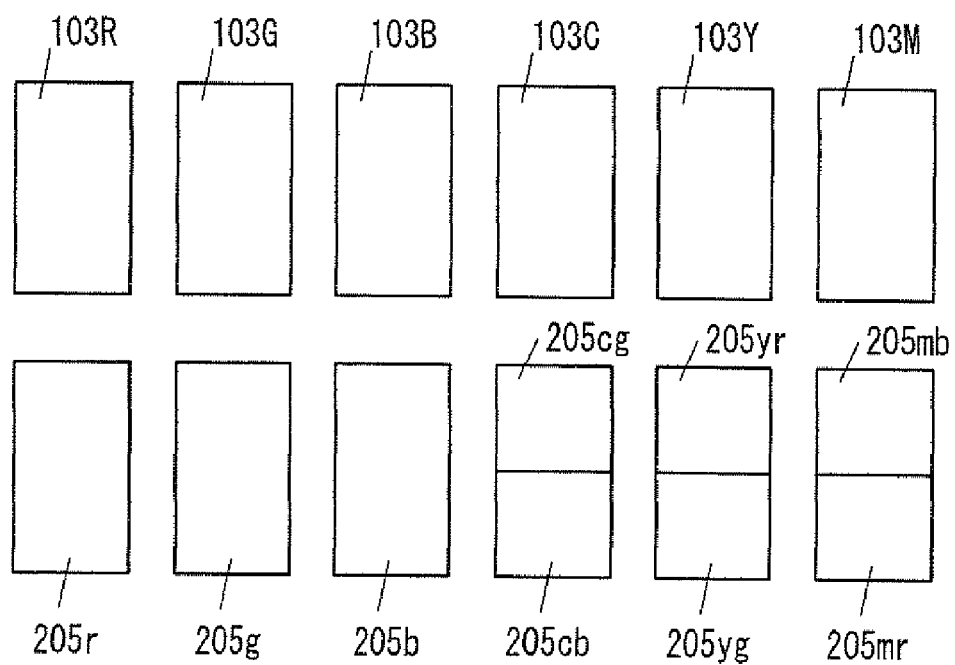
FIG. 11 is a schematic view showing a positional relationship between the picture elements of a display liquid crystal panel and the translucent electrode films of a viewing angle control device in a modified example of a display of the present invention.
Figure 12B:
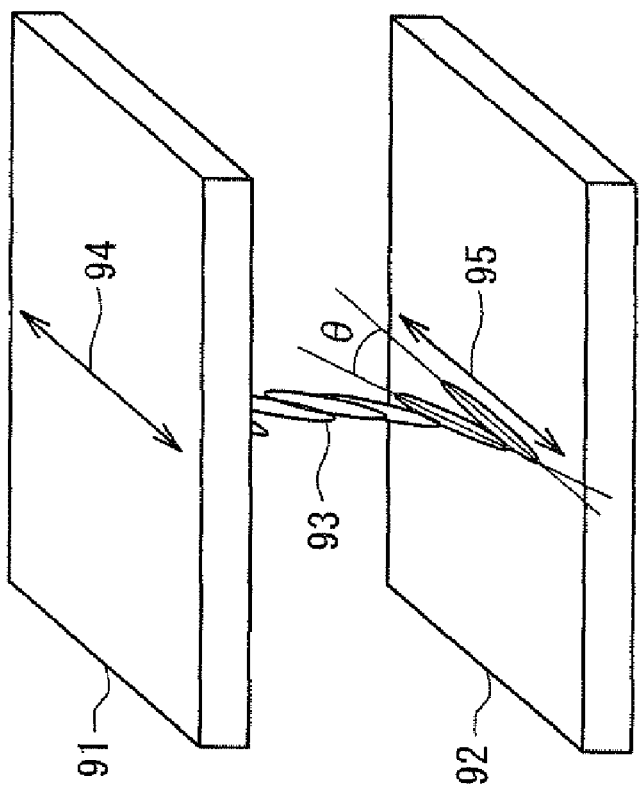
FIG. 12A shows a wide viewing angle state and FIG. 12B shows a narrow viewing angle state.
Figure 12A:
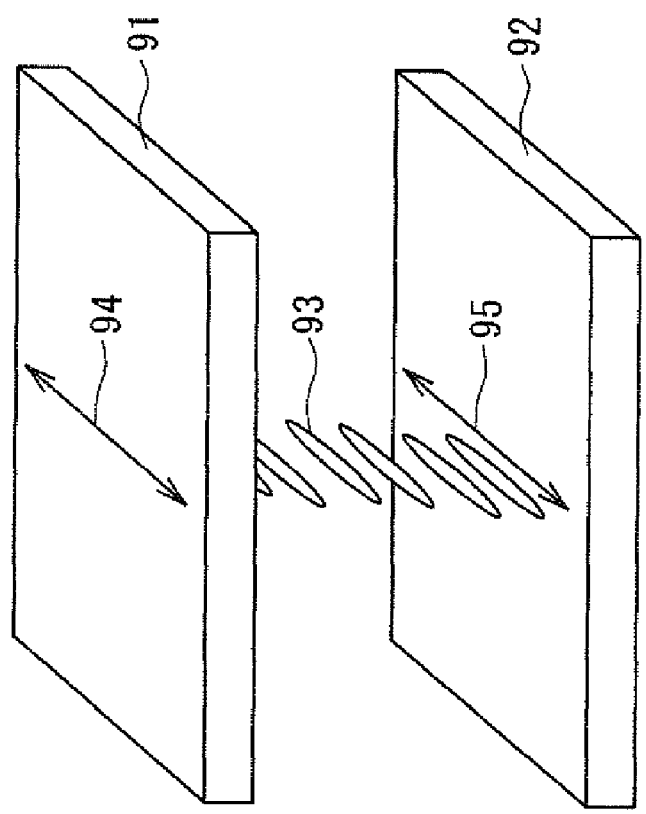
Figure 13:
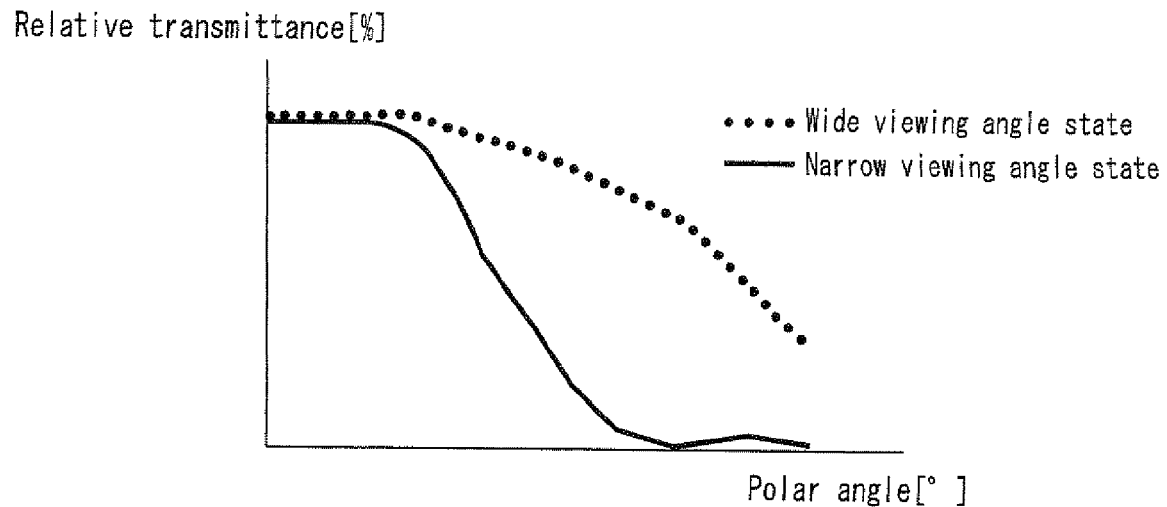
FIG. 13 is a graph showing the dependence of transmittance on polar angle in the wide and narrow viewing angle states in a conventional viewing angle control device.
Figure 14:
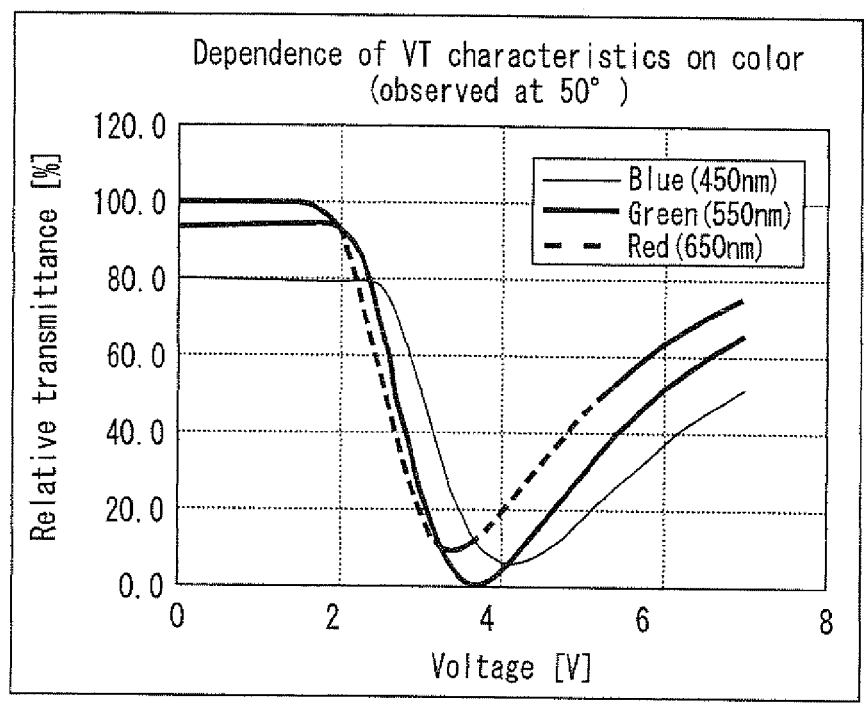
FIG. 14 is a graph showing the VT characteristics of each color component when a conventional viewing angle control device is viewed from an oblique direction.

As shown in FIG. 11, in the display liquid crystal panel 1, each pixel may be composed of a total of six colors of picture elements, i.e., three primary colors (red (R), blue (B), and green (G)) of picture elements, a cyan (C) picture element, a yellow (Y) picture element, and a magenta (M) picture element. In this case, as shown in FIG. 11, the color filters 103 of the display liquid crystal panel 1 include a red filter 103R, a green filter 103G, a blue filter 103B, a cyan filter 103C, a yellow filter 103Y, and a magenta filter 103M that are arranged in stripes. However, the sequence and the relative positional relationship of the color filters are not limited to those shown in FIG. 11. In this case, as shown in FIG. 11, the translucent electrode film 205 of the viewing angle control liquid crystal panel 2 is patterned so that the translucent electrode films 205r, 205g, and 205b are independent of one another and arranged at the positions corresponding to the red picture element (red filter 103R), the green picture element (green filter 103G), and the blue picture element (blue filter 103B) of the display liquid crystal panel 1, respectively. Moreover, a portion of the translucent electrode film 205 that corresponds to the cyan picture element (cyan filter 103C) is divided into two substantially equal regions (sub-electrodes 205cg and 205cb). The two sub-electrodes 205cg and 205cb are patterned to be electrically independent of each other. Further, a portion of the translucent electrode film 205 that corresponds to the yellow picture element (yellow filter 103Y) is divided into two substantially equal regions (sub-electrodes 205yr and 205yg). The two sub-electrodes 205yr and 205yg are patterned to be electrically independent of each other. Furthermore, a portion of the translucent electrode film 205 that corresponds to the magenta picture element (magenta filter 103M) is divided into two substantially equal regions (sub-electrodes 205mr and 205mb). The two sub-electrodes 205mr and 205mb are patterned to be electrically independent of each other. Although not shown in FIG. 11, the sub-electrodes 205cg and 205yg as well as the translucent electrode film 205g are connected to the alternating-current chive voltage generator 300g. The sub-electrodes 205cb and 205mb as well as the translucent electrode film 205b are connected to the alternating-current drive voltage generator 300b. The sub-electrodes 205yr and 205mr as well as the translucent electrode film 205r are connected to the alternating-current drive voltage generator 300r.

As described above, the sub-electrodes 205mr and 205mb driven by the alternating-current drive voltage generators 300r and 300b are also patterned in the portion corresponding to the magenta picture element (magenta filter 103M). Accordingly, when the viewing angle control liquid crystal panel 2 is in the narrow viewing angle state, coloring of light that passes through the portion corresponding to the magenta picture element can be suppressed, and a pure black display can be achieved.

Industrial Applicability

The present invention is industrially applicable as a viewing angle control device that can achieve a black display without coloring in the narrow viewing angle state and have a significantly improved shielding ability in the narrow viewing angle state, and as a display using the viewing angle control device.

The invention claimed is:

1. A display comprising:
    a display device that comprises a plurality of colors of picture elements, each of which is driven in accordance with an image to be displayed; and
    a viewing angle control device that is arranged on at least one of a back and a front of the display device and controls a viewing angle of the display device,
    wherein the viewing angle control device comprises: a pair of substrates, each of which includes at least an electrode and an alignment film; liquid crystal sandwiched between the pair of substrates; a driving circuit for applying a voltage to the electrodes provided on the pair of substrates; and a pair of polarizers provided so as to sandwich the pair of substrates therebetween,
    wherein the driving circuit switches a voltage to be applied to the electrodes, thereby switching a range of the viewing angle in which a display of the display device can be viewed, between a first state providing a first viewing angle range and a second state providing a second viewing angle range that is within the first viewing angle range and narrower than the first viewing angle range,
    wherein the electrode of at least one of the pair of substrates of the viewing angle control device is provided so that a portion corresponding to at least one color of the picture element of the display device is electrically independent of portions corresponding to the other colors of the picture elements, and
    wherein the driving circuit of the viewing angle control device applies an alternating-current voltage to the portion of the electrode corresponding to at least one color of the picture element of the display device so that a frequency of the alternating-current voltage differs from frequencies of alternating-current voltages applied to the portions of the electrode corresponding to the other colors of the picture elements, thereby adjusting voltage-transmittance characteristics of the liquid crystal of the viewing angle control device.

2. The display according to claim 1, wherein the plurality of colors of picture elements include three colors of picture elements that produce white when mixed, and
    the electrode of at least one of the pair of substrates of the viewing angle control device is provided so that portions corresponding to the three colors of the picture elements of the display device are electrically independent of one another.

3. The display according to claim 2, wherein the three colors of the picture elements are red, green, and blue picture elements.

4. The display according to claim 2, wherein the plurality of colors of picture elements further include a white picture element, and
    wherein in the electrode of at least one of the pair of substrates of the viewing angle control device, a portion corresponding to the white picture element is divided into three sub-electrodes, and alternating-current voltages are applied to each of the sub-electrodes so that frequencies of the alternating-current voltages are the same as those of alternating-current voltages applied to the portions corresponding to the three colors of the picture elements, respectively.

5. The display according to claim 3, wherein the plurality of colors of picture elements further include a picture element of a complementary color of at least one of the three colors, and
    wherein in the electrode of at least one of the pair of substrates of the viewing angle control device, a portion corresponding to the complementary color picture element is divided into two sub-electrodes, and alternating-current voltages are applied to each of the sub-electrodes so that frequencies of the alternating-current voltages are the same as those of alternating-current voltages applied to the portions corresponding to the picture elements of two colors that constitute the complementary color, respectively.

6. The display according to claim 5, wherein a cyan picture element is included as the complementary color picture element, and wherein in the electrode of at least one of the pair of substrates of the viewing angle control device, a portion corresponding to the cyan picture element is divided into two sub-electrodes, and alternating-current voltages are applied to each of the sub-electrodes so that frequencies of the alternating-current voltages are the same as those of alternating-current voltages applied to the portions corresponding to the green picture element and the blue picture element of the display device, respectively.

7. The display according to claim 6, wherein the plurality of colors of picture elements further include a yellow picture element, and wherein in the electrode of at least one of the pair of substrates of the viewing angle control device, a portion corresponding to the yellow picture element is divided into two sub-electrodes, and alternating-current voltages are applied to each of the sub-electrodes so that frequencies of the alternating-current voltages are the same as those of alternating-current voltages applied to the portions corresponding to the green picture element and the red picture element of the display device, respectively.

8. The display according to claim 6, wherein the plurality of colors of picture elements further include a magenta picture element, and wherein in the electrode of at least one of the pair of substrates of the viewing angle control device, a portion corresponding to the magenta picture element is divided into two sub-electrodes, and alternating-current voltages are applied to each of the sub-electrodes so that frequencies of the alternating-current voltages are the same as those of alternating-current voltages applied to the portions corresponding to the red picture element and the blue picture element of the display device, respectively.

9. The display according to claim 3, satisfying $fb<fg<fr$, where fr, fg, and fb represent frequencies of alternating-current voltages applied from the driving circuit of the viewing angle control device to portions of the electrode of the viewing angle control device that correspond to the red picture element, the green picture element, and the blue picture element, respectively.

10. The display according to claim 1, wherein a liquid crystal layer of the viewing angle control device includes positive-type nematic liquid crystal, polarization-transmission axes of the polarizers are arranged substantially parallel to rubbing directions of the alignment films, and the driving circuit applies no voltage to the liquid crystal layer and thus provides the first viewing angle range, and applies a predetermined voltage to the liquid crystal layer and thus provides the second viewing angle range.

11. The display according to claim 1, wherein the alignment films provided on the pair of substrates of the viewing angle control device are subjected to a rubbing process in directions parallel and opposite to each other.

12. A viewing angle control device that is arranged on at least one of a back and a front of a display device in which a plurality of colors of picture elements are driven in accordance with an image to be displayed, and that controls a viewing angle of the display device, comprising:

a pair of substrates, each of which includes at least an electrode and an alignment film;

liquid crystal sandwiched between the pair of substrates;

a driving circuit for applying a voltage to the electrodes provided on the pair of substrates; and a pair of polarizers provided so as to sandwich the pair of substrates therebetween, wherein the driving circuit switches a voltage to be applied to the electrodes, thereby switching a range of the viewing angle in which a display of the display device can be viewed, between a first state providing a first viewing angle range and a second state providing a second viewing angle range that is within the first viewing angle range and narrower than the first viewing angle range, wherein the electrode of at least one of the pair of substrates is provided so that a portion corresponding to at least one color of the picture element of the display device is electrically independent of portions corresponding to the other colors of the picture elements, and wherein the driving circuit applies an alternating-current voltage to the portion of the electrode corresponding to at least one color of the picture element of the display device so that a frequency of the alternating-current voltage differs from frequencies of alternating-current voltages applied to the portions of the electrode corresponding to the other colors of the picture elements, thereby adjusting voltage-transmittance characteristics of the liquid crystal of the viewing angle control device.

* * * * *